US012266015B2

(12) United States Patent
Gould et al.

(10) Patent No.: US 12,266,015 B2
(45) Date of Patent: Apr. 1, 2025

(54) ELEMENT IN CONNECTION WITH CONCURRENT PRESENTATION DURING SERVER OPERATION

(71) Applicant: Truist Bank, Charlotte, NC (US)

(72) Inventors: Dirk Evan Gould, Rancho Santa Margarita, CA (US); Dustin Tyler Jennings, Lewisville, NC (US); Jared Stephen Bunn, Clemmons, NC (US); Brent William Vaassen, Clemmons, NC (US)

(73) Assignee: TRUIST BANK, Charlotte, NC (US)

( * ) Notice: Subject to any disclaimer, the term of this patent is extended or adjusted under 35 U.S.C. 154(b) by 309 days.

(21) Appl. No.: 18/150,036

(22) Filed: Jan. 4, 2023

(65) Prior Publication Data

US 2024/0221072 A1   Jul. 4, 2024

(51) Int. Cl.
*G06Q 30/00* (2023.01)
*G06F 9/451* (2018.01)
*G06Q 40/03* (2023.01)

(52) U.S. Cl.
CPC .......... *G06Q 40/03* (2023.01); *G06F 9/451* (2018.02)

(58) Field of Classification Search
None
See application file for complete search history.

(56) References Cited

U.S. PATENT DOCUMENTS

| | | | |
|---|---|---|---|
| 9,922,356 | B1 | 3/2018 | Garcia, III |
| 2010/0017300 | A1 | 1/2010 | Bramlage |
| 2014/0052584 | A1 | 2/2014 | Gershon |
| 2014/0316931 | A1 | 10/2014 | Selcuk |
| 2016/0189260 | A1 | 6/2016 | Nagla |
| 2022/0261869 | A1 | 8/2022 | Hong |
| 2022/0366494 | A1 | 11/2022 | Cella |

OTHER PUBLICATIONS

The transformation from manual to smart warehousing (Year: 2022).

*Primary Examiner* — Mila Airapetian
(74) *Attorney, Agent, or Firm* — Michael A. Springs, Esq.; Shumaker, Loop & Kendrick, LLP; Patrick B. Horne

(57) ABSTRACT

A system for interfacing with one or more application programing interfaces to generate a graphical representation of an interactive element. The application programing interface(s) include instructions to receive and execute viewing instructions stored on the server for an item for transfer of title to a user on a display. One instruction is to identify, from two or more potential items, a concurrent item associated with the viewed item and a respective interactive element indicative of an executable element and one or more of a total amount, a term, or a term amount. The graphical user interface includes instructions to receive the representation of the interactive element associated with the concurrent item and generate the interactive element from the same. A further instruction of the graphical user interface is to present the interactive element in association with the viewed item and on the display.

20 Claims, 6 Drawing Sheets

ELEMENT IN CONNECTION WITH CONCURRENT PRESENTATION DURING SERVER OPERATION

FIELD

This invention relates generally to the field of elements associated with the execution of server instructions, and more particularly to generating and presenting a concurrent or real-time element suitable for interaction in association with an item presented by executing the instructions stored on a server.

BACKGROUND

Websites and ecommerce are vital tools in the world economy. Every product a consumer can imagine are provided from various websites offering goods and services for sale. Generally, a user opens a website, webpage, app entry, etc. to purchase an item by accessing the digital location associated with the item, which includes computer executable instructions, and running those instructions on a local computer or personal device. Some items offered for online sale can be purchased in a single interaction. A purchaser will often buy such an item without the need or desire for financing. Other items may be prohibitively expensive for some consumers to afford outright or in a single payment. Thus, financing is offered for major purchases by various financial institutions allowing a purchaser to buy an item on credit.

Consumers are often left to explore available financing options without assistance. For knowledgeable consumers and businesses, locating external financing options may be an inconvenience, so much so that some potential purchasers reconsider the purchase rather than travel a physical location or other onsite financing provider. Some consumers incorrectly believe that the costs of financing and the item of interest are beyond their price ranges. Some consumers, such as first time major purchasers, may not be aware of financing options for expensive purchases. A portion of consumers are unaware of financing opportunities for personal property and equipment other than vehicles.

In view of the circumstances described above, there is a need for a system to identify and promote financing opportunities available to a potential consumer while viewing an item of interest.

BRIEF SUMMARY

Embodiments of the present invention address the above needs and/or achieve other advantages by providing systems, apparatuses, and methods that determine a concurrent or real-time element promoting financing promotions in association with viewing or executing instructions to view an item stored on a server. By receiving a communication or indication that an item is viewed, the indication may be compared to potential items within an item storehouse of the system. The potential items are represented within the item storehouse and associated with interactive elements, each allowing for eventual execution and presentation of an executable element and promotional financing terms such as total amounts, terms, and term amounts to a potential purchaser needing or desiring financing. Once the viewed item is identified among the potential items, a communication representing such identified or concurrent item and its respective interactive element is generally communicated for real-time or concurrent presentation in connection with executing the instructions stored on the server presenting the item for the user or consumer to view. In exemplary embodiments, presenting the interactive element to the potential purchaser may involve presenting an executable element indicative of a different digital server location that allows the potential purchaser to visit the different location and execute its instructions, such as to begin a financing application. In various embodiments, the item storehouse may include items associated with multiple interactive elements. For example, any of the interactive elements of the item storehouse, such as all of the elements, and respective potential items may each be associated or representative of a promotional financing offer and/or a subsidized financing offer. Each interactive element associated with a concurrent item may be communicated, once identified, or the interactive element indicative of the lowest total amount or financed amount may be communicated.

Aspects of the present subject matter are directed to a system for interfacing with one or more application programing interface to generate a graphical representation of an interactive element. The system includes one or more computers, processors, and non-transitory storage devices. The processor(s) execute a user application programing interface, a second server application programing interface, and a graphical user interface. The user application programing interface is configured to perform steps including to receive, at a computing device, viewing instructions stored on the server and configured to present a viewed item for transfer of title. The instructions include an indication of a viewed item ID. A further step of the user application programing interface is to communicate, to a second server, an indication of the viewed item ID in response to executing the viewing instructions. An additional step of the user application programing interface is to receive, at the computing device, the representation of the interactive element that is associated with the concurrent item that is identified as the viewed item. A further step of the user application programing interface is to communicate the representation of the interactive element that is associated with the concurrent item to the graphical user interface. The second server application programing interface is configured to perform steps including to receive a communication in connection with executing instructions stored on the server. The communication includes an indication of the viewed item ID. A further step of the second server application programing interface is to compare, in response to the communicated indication of the viewed item ID, the indication of the viewed item ID with two or more potential items represented by an item storehouse. Each potential item is associated with a potential interactive element. A further step performed by the second server application programming interface is to identify a concurrent item of the potential items that is associated with the viewed item and the interactive element that is associated with the concurrent item. The interactive element that is associated with the concurrent item is indicative of an executable element and one or more of a total amount, a term, or a term amount. An additional step of the second server application programing interface is to communicate, to the computing device, a representation of the interactive element that is associated with the concurrent item. The graphical user interface is configured to perform steps including to execute at least a portion of the viewing instructions such that the viewed item is presented to a user on a display of the computing device. A further step of the graphical user interface is to receive the representation of the interactive element that is associated with the concurrent item that is identified as the viewed item.

The graphical user interface includes another step to generate, based on the representation of the interactive element, the interactive element. An additional step of the graphical user interface is to present, on the display of the computing device and in association with the viewed item, the executable element and one or more of the total amount, the term, or the term amount utilizing the generated interactive element.

In at least one embodiment, a product of a multiplication of the term and the term amount is equal to or greater than the total amount.

In an additional or alternative aspect, the present subject matter is directed to a system for interfacing with one or more application programing interfaces to generate a graphical representation of an interactive element. The system includes one or more computers, processors, and non-transitory storage devices. The processor(s) execute computer-readable instructions including to receive, at a computing device, viewing instructions stored on the server configured to present a viewed item for transfer of title. The viewing instructions include an indication of a viewed item ID. A further instruction includes to execute at least a portion of the viewing instructions such that the viewed item is presented to a user on a display of the computing station. An additional instruction includes to compare, in response to the communicated indication of the viewed item ID, the indication of the viewed item ID with two or more potential items represented by an item storehouse. Each potential item is associated with a potential interactive element. One instruction includes to identify a concurrent item of the potential items that is associated with the viewed item and the interactive element that is associated with the concurrent item. The interactive element that is associated with the concurrent item is indicative of an executable element and one or more of a total amount, a term, or a term amount. Another step executed by the processor(s) is to receive, at a graphical user interface, the representation of the interactive element that is associated with the concurrent item that is identified as the viewed item. A further instruction includes to generate the interactive element utilizing the graphical user interface and based on the representation of the interactive element. An additional instruction includes to present, on the display of the computing device and in association with the viewed item, the executable element and one or more of the total amount, the term, or the term amount utilizing the generated interactive element and the graphical user interface.

In at least one embodiment, a product of a multiplication of the term and the term amount is equal to or greater than the total amount. In an additional or alternative embodiment, the processor(s) may further implement an instruction to communicate, to the computing device, a representation of the interactive element that is associated with the concurrent item. In an additional or alternative embodiment, the viewed item ID may be indicative of one or more of a model code, a serial code, or an evaluated amount associated with the viewed item.

In an additional or alternative embodiment, one or more potential items may be each associated with two or more interactive elements. In some embodiments, two or more potential items may each associated with a plurality of interactive elements. In an additional or alternative embodiment, when the concurrent item is a potential item associated with two or more interactive elements, further instructions implemented by the processor(s) may include one or more of to communicate a representation of each interactive element that is associated with the concurrent item; to receive, at the graphical user interface, the representation of each interactive element that is associated with the concurrent item that is identified as the viewed item; to generate, based on each representation of an interactive element, each interactive element utilizing the graphical user interface; and to present, on the display of the computing device and in association with the viewed item, the executable element and at one or more of the total amount, the term, or the term amount for each interactive element that is associated with the concurrent item utilizing the graphical user interface. In an additional or alternative embodiment, a further instruction implemented by the processor(s) may include to communicate a representation of the interactive element indicative of the lowest total amount.

In an additional or alternative embodiment, the concurrent item may be associated with an evaluated amount. The evaluated amount may be greater than the total amount indicated by the interactive element that is associated with the concurrent item. In an additional or alternative embodiment, a difference between the evaluated amount and the total amount associated with the concurrent item may be associated with or partially associated with a subsidy. In an additional or alternative embodiment, the total amount indicated by the interactive element that is associated with the concurrent item may be determined or partially determined from the evaluated amount associated with the concurrent amount, the subsidy, and an interest rate associated with the interactive element.

In an additional or alternative embodiment, the interactive element may be indicative of a different digital location on the server or on another server. Moreover, the representation of the interactive element that is associated with the concurrent item may be configured such that the user executing the viewing instructions on the server may selectively visit the different digital location or execute instructions stored at the different digital location. Additional or alternatively, the processor(s) may implement instructions to communicate user financing information to an offer generating program indicated by the instructions stored at the different digital location. In additional or alternative embodiments, the user financing information may be indicative of one or more of a desired total amount, a desired term, a desired term amount, or a user credit score. In an additional or alternatively, the processor(s) may implement instructions to receive, at the computing device, a representation of a user customized promotional offer. In an additional or alternative embodiment, the processor(s) my implement instructions to present, on the display of the computing device and in association with the viewed item, the user customized promotional offer. The user customized promotional offer may be indicative of one or more of an annual percentage rate, a payment amount, a total cost, an interest cost, or associated terms. In an additional or alternative embodiment, the user customized promotional offer may be presented on the display of the computing device and in proximity to the viewed item. In an additional or alternative embodiment, the interactive element may be presented on the display of the computing device and in proximity to the viewed item.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
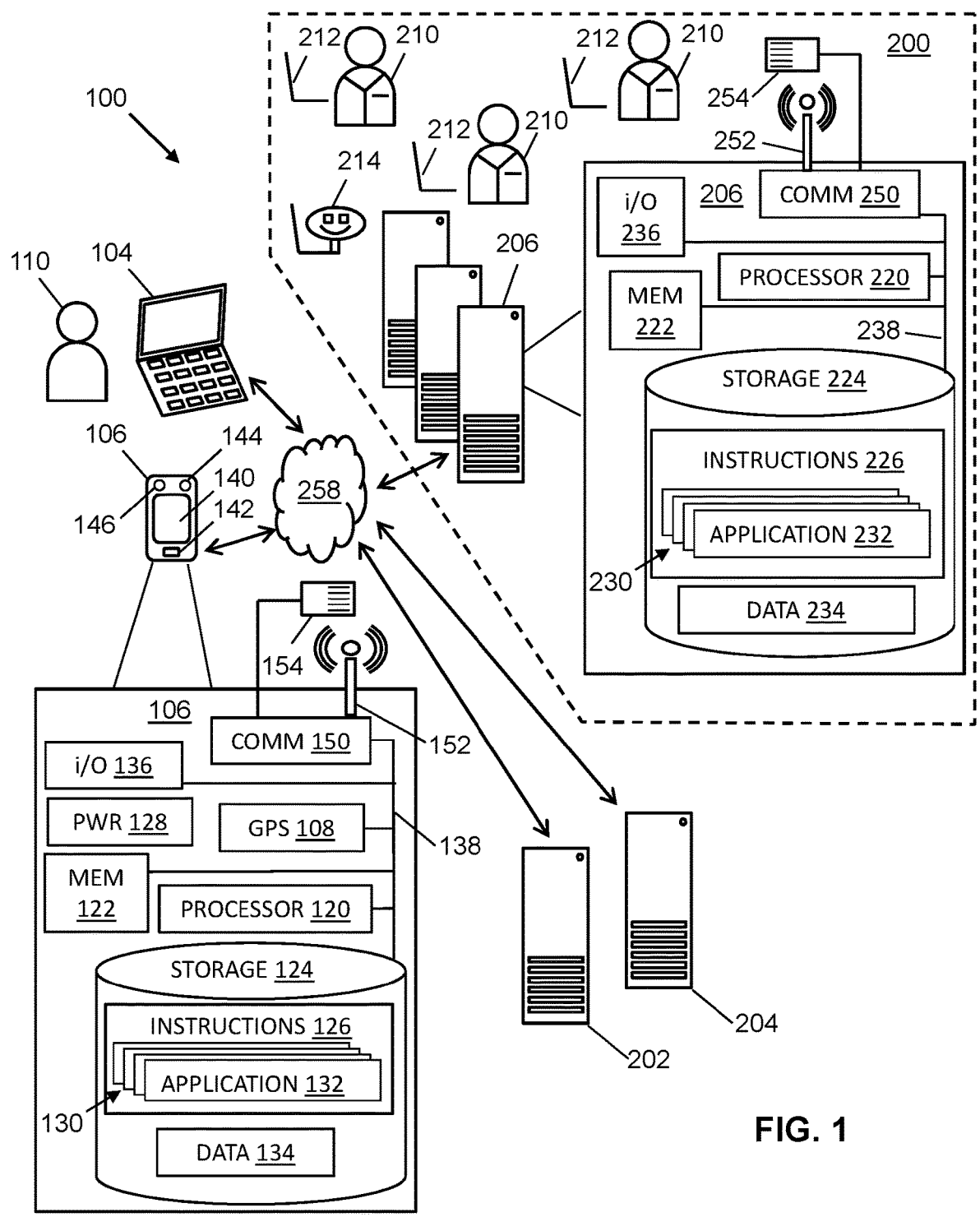
Figure 2:
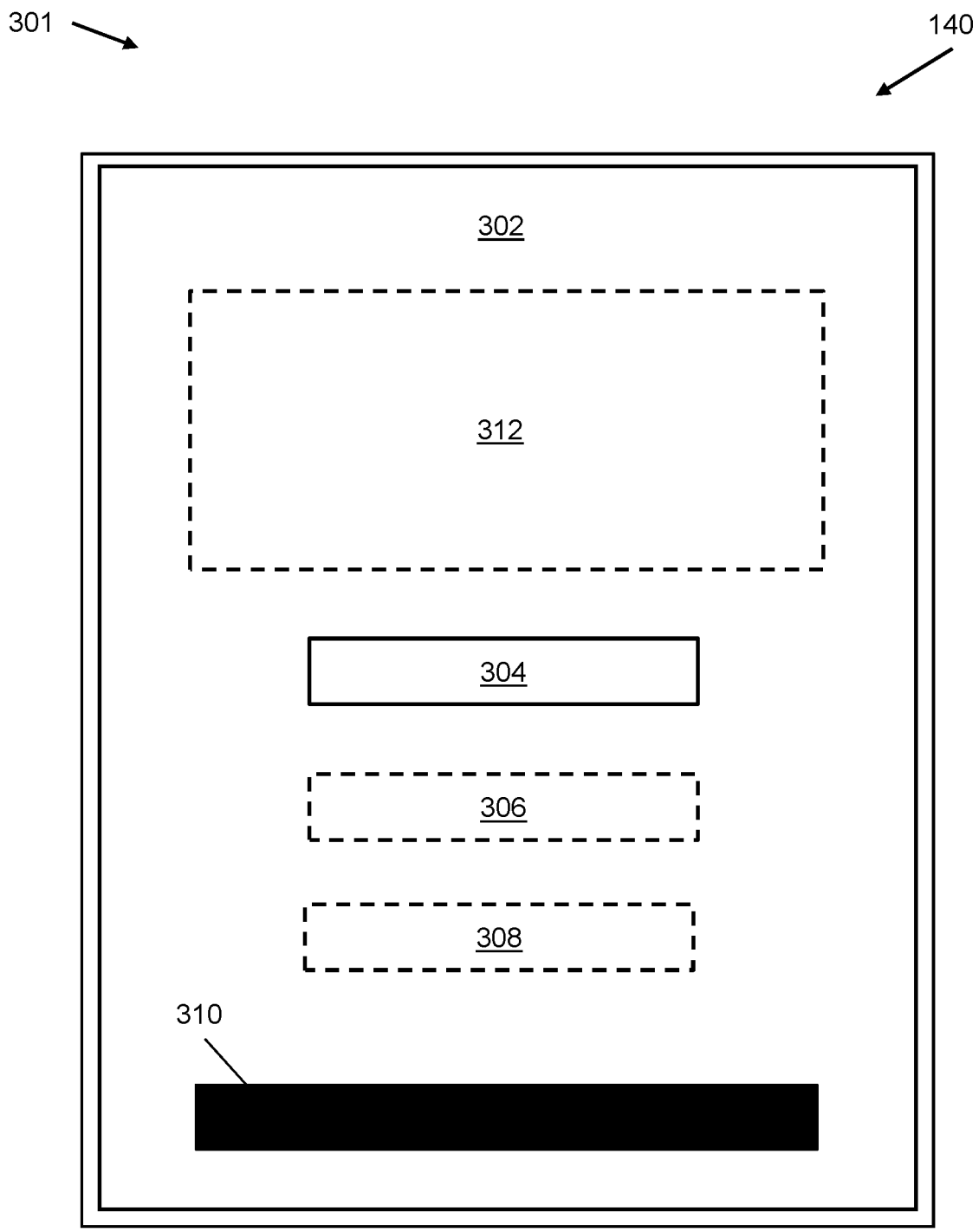
Figure 3:
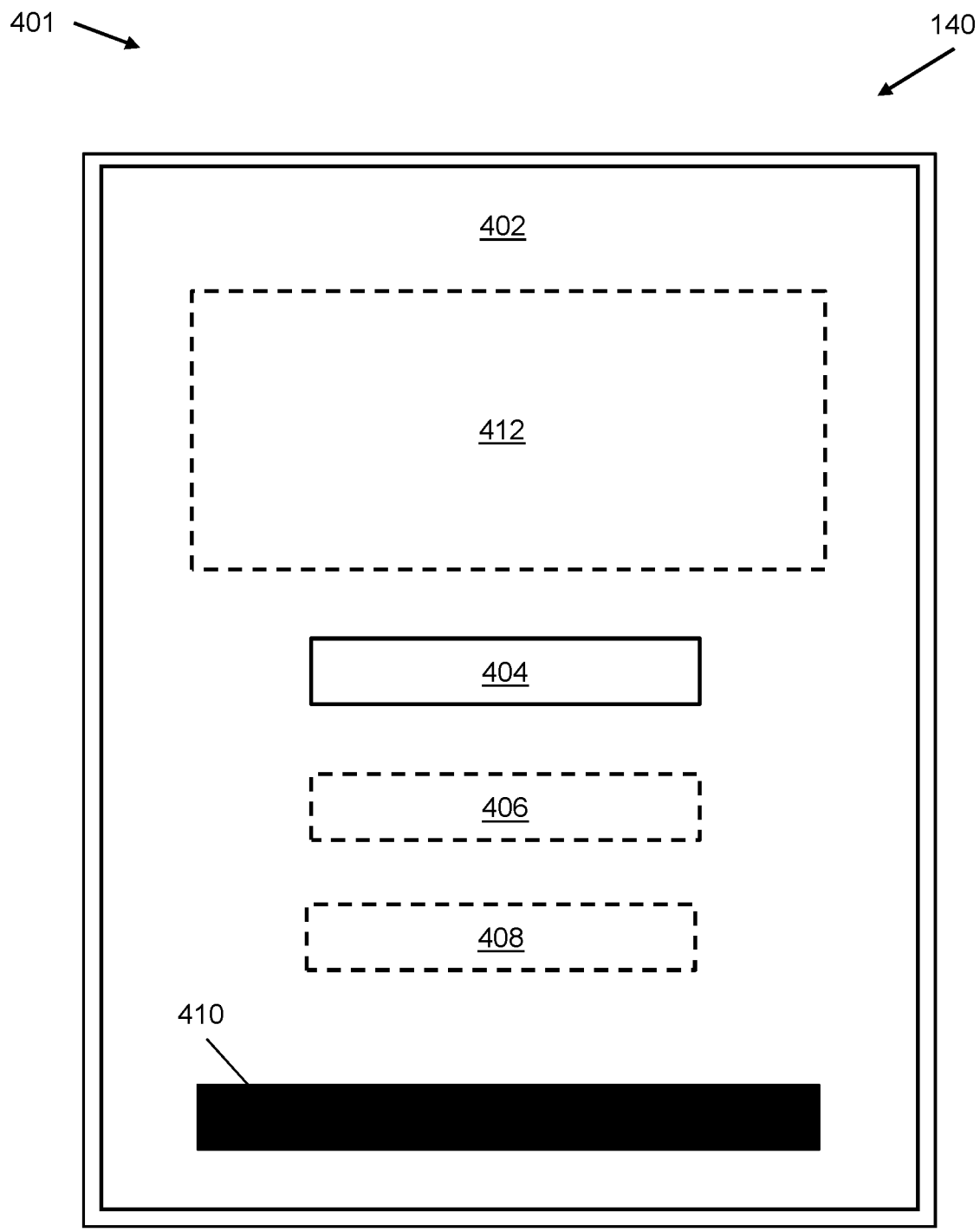
Figure 4:
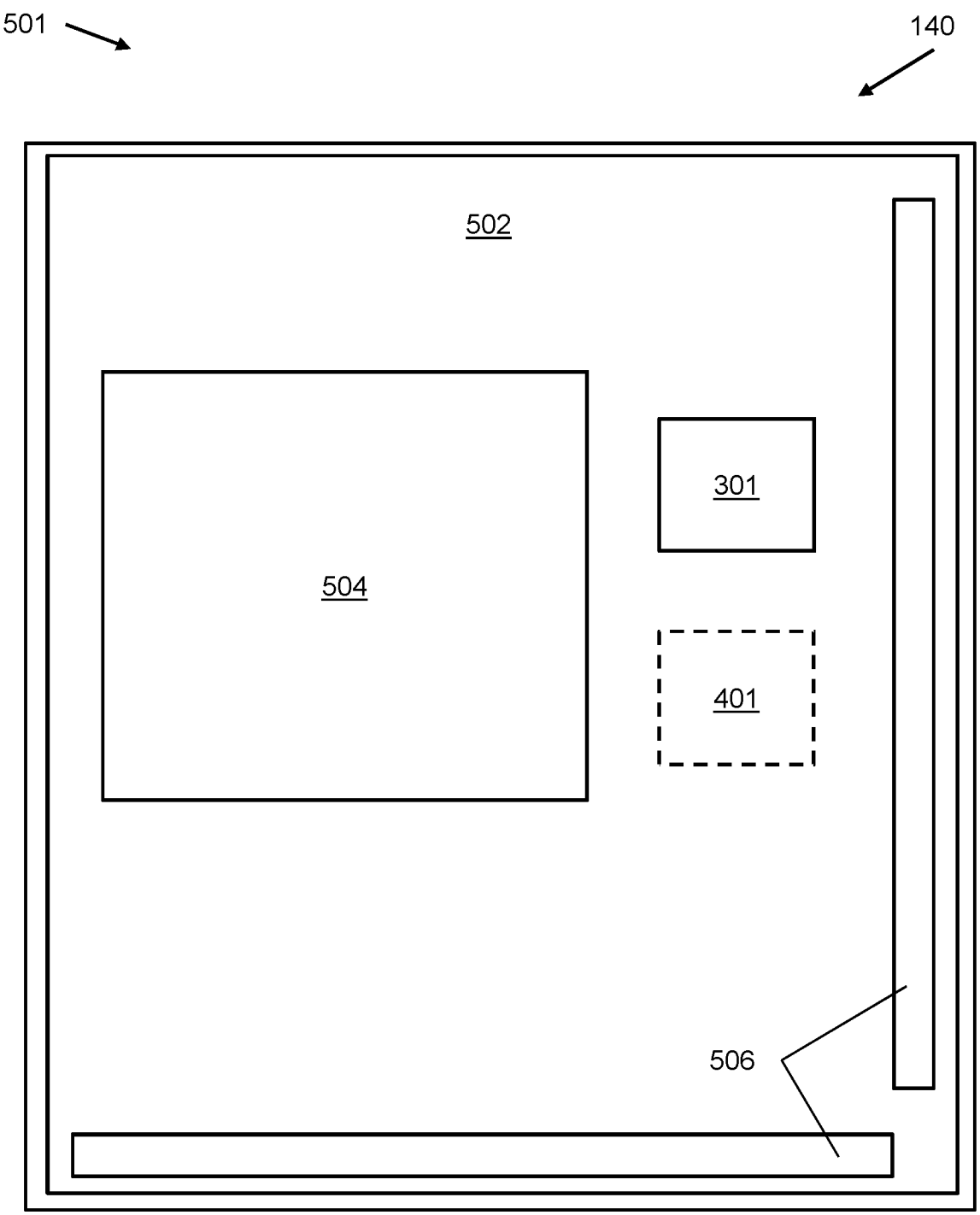
Figure 5:
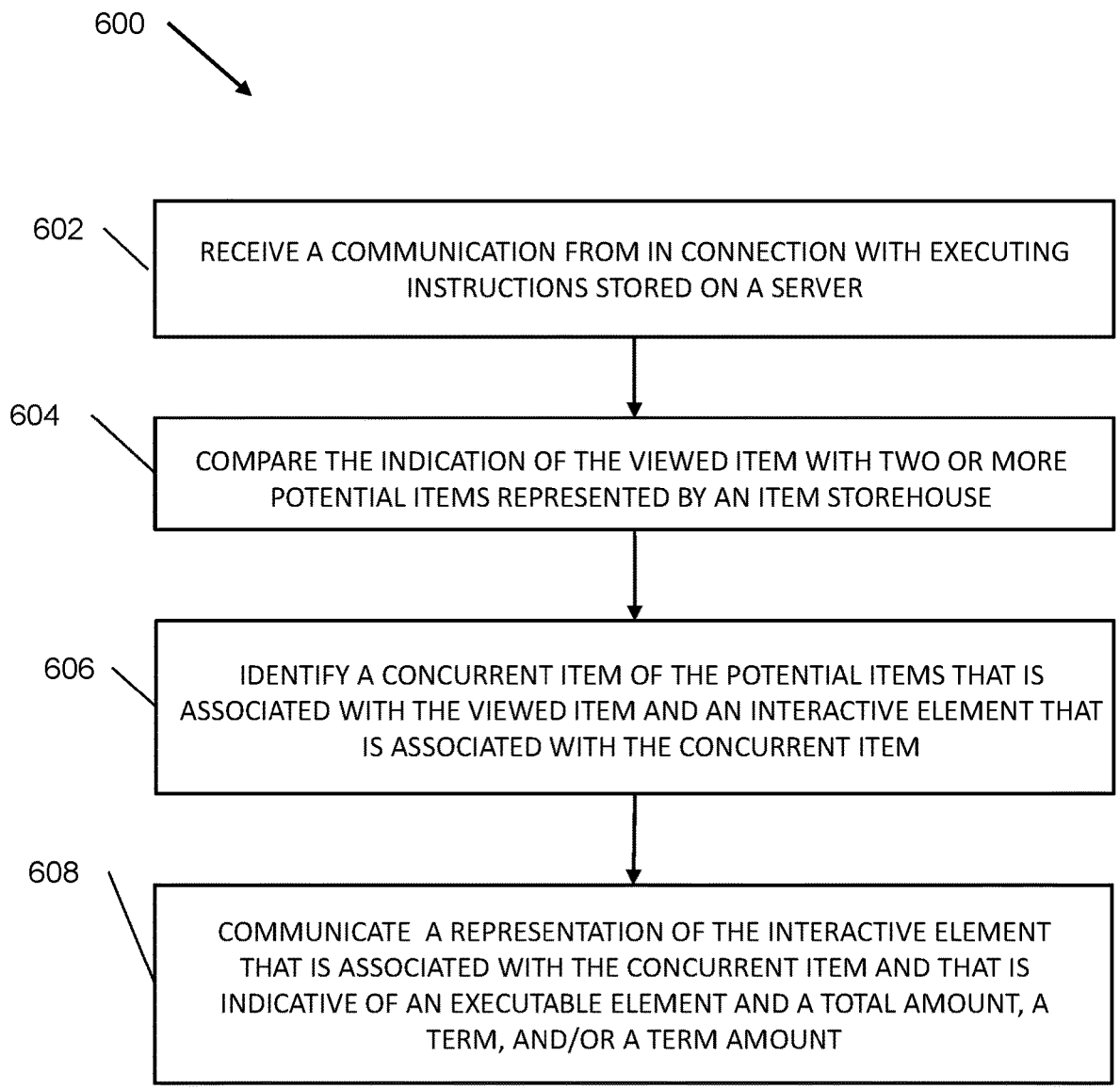
Figure 6:
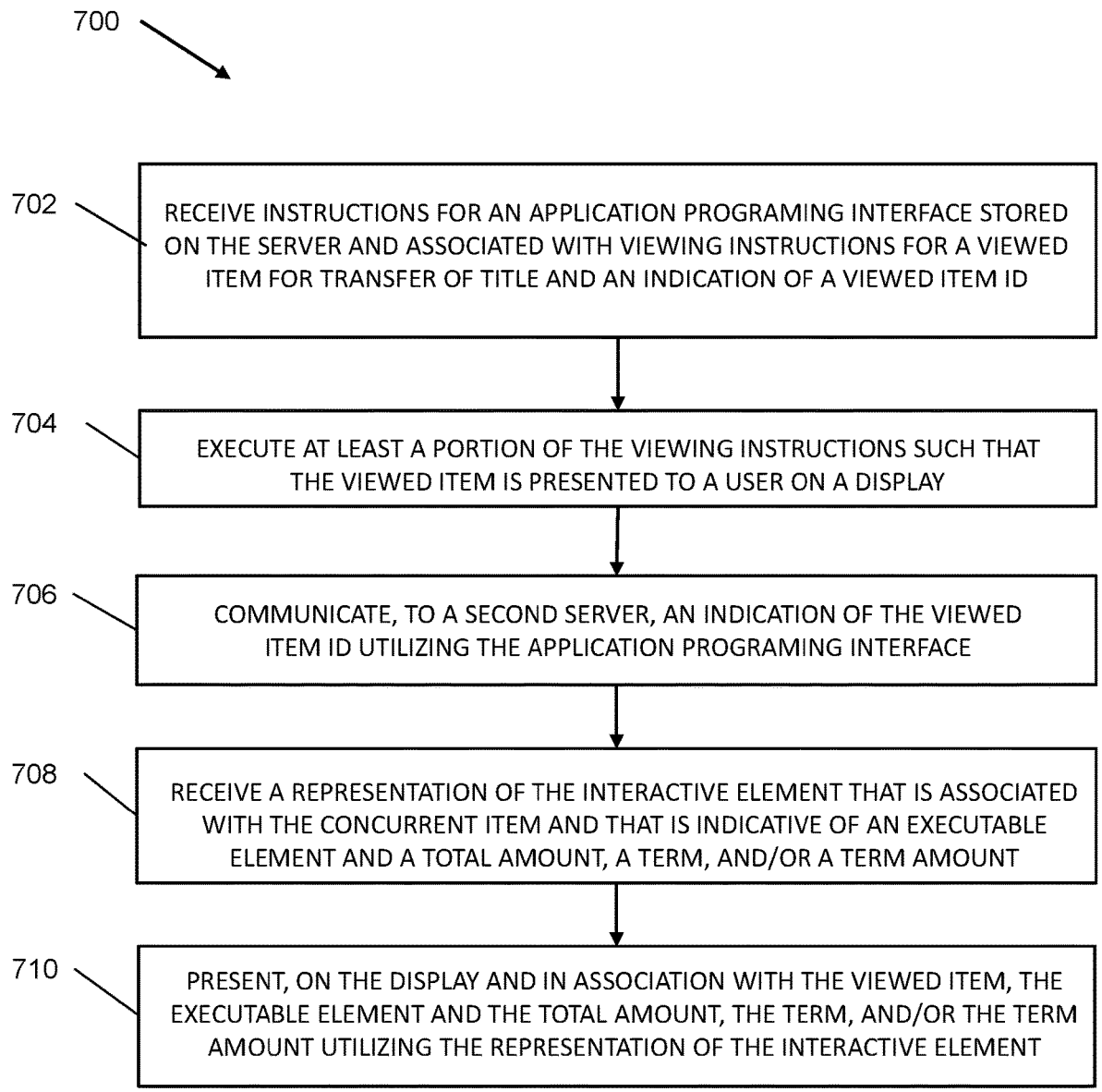

Having thus described embodiments of the invention in general terms, reference will now be made to the accompanying drawings, wherein:

FIG. 1 illustrates an enterprise system, and environment thereof, suitable for determining a concurrent interactive element in connection with executing server instructions, in accordance with exemplary aspects of the present subject matter;

FIG. 2 is a schematic diagram of an interactive element suitable for presentation with a viewed item in connection with executing server instructions, in accordance with exemplary aspects of the present subject matter;

FIG. 3 is a schematic diagram of user customized promotional offer for presentation with a viewed item in connection with executing server instructions, in accordance with exemplary aspects of the present subject matter;

FIG. 4 is a schematic diagram of graphical user interface architecture for presentation of an interactive element in connection with a viewed item, in accordance with exemplary aspects of the present subject matter;

FIG. 5 is a flow chart representing a method, according to at least one embodiment, for determining a concurrent interactive element in connection with executing instructions stored on a server; and FIG. 6 is a flow chart representing a method, according to at least one embodiment, for concurrently presenting an interactive element in connection with executing instructions stored on a server.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140

(e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

According to certain embodiments of the invention described herein, as a webpage loads, one or more variables in any combination (i.e. model code, term, amount, credit score, etc) are transmitted to a third-party server and one or more variables related to subsidized financing (i.e. rate, payment, total cost, terms etc.) are returned and rendered on the webpage in real time. These variable can be returned in any combination and the retuned variables may or may not be limited to just one promotion.

According to some embodiments of the invention described herein, a user inputs/adjusts one or more variables in any combination (model code, term, amount, credit score, etc) into a third-party web from/web calculator and the variables are transmitted to a third-party server and one more variables related to subsidized financing (rate, payment, total cost, terms etc) are returned and rendered on the webpage/web form/calculator in real time in any combination. These variable can be returned in any combination and the retuned variables may or may not be limited to just one promotion. The subsidized financing can be rendered on page load, user update of a field or by user action of clicking a button. Assume no browser plugin required for this item.

According to some other embodiments of the invention described herein, a user texts/emails/chatbox one or more variables in any combination (model code, term, amount, credit score, etc) to a provided phone number which transmits to a third party server and one more variables related to subsidized financing (rate, payment, total cost, terms etc) are returned and rendered on the screen of the user's device in real time in any combination. These variable can be returned in any combination and the retuned variables may or may not be limited to just one promotion.

According to additional embodiments of the invention described herein, a website's web form (i.e. loan application) with one or more variables in any combination (model code, term, amount, credit score, contact info etc.) are transmitted to a third party server and one more variables related to subsidized financing (rate, payment, total cost, terms etc) are returned and rendered on the screen of the user's device in real time in any combination. These variables can be returned in any combination and the retuned variables may or may not be limited to just one promotion.

TABLE 1

| Product/Client Variables These typically will be inputs, but as shown on page 2 these could also be returned as outputs with financing variables. | Financing Variables These typically will be outputs, but as shown on page 2 these could also be sent as input. | User Variables These typically will be inputs, but in some situations these could also be returned as outputs with financing variables. |
|---|---|---|
| Manufacturer name (sometimes called brand, make) Model/Product category - Sport, Utility, Two-wheel, etc. Should not be specific to any industry. Type of Model/Product - i.e. - Motorcycle, ATV, Side by Side, Lawn Mower, Trailer, etc. Should not be specific to any industry. Model/Product number Model/Product description Vin number/Serial Number Stock number (any unique identifier of product) Manufacturer year (aka model/ product year) - i.e. 2023, 2022, 2021 Model/Product Price Manufacturer Suggested Retail Price Client/Dealership/Store name Client/ Dealership/Store number or unique identifier. | Interest rate/ Annual Percentage Rate Loan Fees To Consumer Loan Fees To Dealer/Store Loan Term in months or years Loan Amount Total Purchase Amount Credit Score/ Credit Score Range Loan Legal Disclaimer Down-payment amount Expire Date Financing Disclosure Type of financing (i.e. installment or revolving) Incentive Credit Tier Financing Promotion Name Loan to Value % Monthly Payment | Name Address Social Security Number (SSN#) Date of Birth Email Address Income (could be monthly or annual) Phone Number Type of Phone Residential Status Years at Residence Housing payment Employment Status Employer Name, address, phone number Unique Offer Code |

TABLE 2

| Inputs Read From a Website (One or more inputs) | Financing Outputs From Third Party Server returned back to the Website (One or more outputs) |
|---|---|
| Scenario 1: Model Number | Interest Rate, Loan Term, Financing Disclosure |
| Scenario 2: Model Number (read from page), SSN# (input by user) | Interest Rate, Loan Term, Financing Disclosure |
| Scenario 3: Store Number, Product Number | Interest Rate 1, Loan Term 1 *more than one subsidized promotion available for the provided model Interest Rate 2, Loan Term 2 |
| Scenario 4: Product Category | Model Description 1, Interest Rate 1, Loan Term 1 (more than one subsidized promotion available), Model Description 2, Interest Rate 2, I Loan Term 2 Model Description 3, Interest Rate 3, Loan Term 3 |
| Scenario 5*: : Product number, Loan Term, Loan Amount, Down Payment Or Loan Amount, Loan Term *Representing situation of a loan calculator with user input | Interest Rate, Monthly payment Of Interest Rate |
| Scenario 6* (Web Form): (Web From): SSN#, Customer Name *Representing situation of a Web From with user input | Interest Rate 1, Loan Term 1, Unique Offer Code 1: (could be one or more rates/terms). |

TABLE 1 above illustrates examples of variables for different use cases, namely, Product/Client variables, Financing Variables, and User Variables. TABLE 2 above is not intended to represent all possible scenarios, but instead is provided to illustrate possible real world use cases. An input, for example, could be one or more variables and an output could be one or more variables.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

With reference to the general architecture, features, and functions as described above, the present subject matter is also directed to applications in which the system (e.g., the enterprise system 200) is used in conjunction with generating interactive financing promotions for services and products, and more particularly embodiments of the invention relate to generating such promotions in real-time to a user (e.g., user 110) viewing an affiliated item on a webpage. For example, the promotional offer may be presented upon the user 110 viewing the affiliated item and using the user system 100 and the enterprise system 200 shown in FIG. 1.

A software application, such as a user application programing interface 132, running on the portable device establishes communication with the enterprise system 200. In response to user data generated by the application 132, e.g., automatically or manually by the user 110, a software application, such as an enterprise application programing interface 232, running on the computing system 206 of the enterprise system 200 generates promotional data to the mobile device 106, the computing device 104, and/or the like. Such promotional data may be related to financing. As explained below, the promotional data may include promotional information related to financing a product, item, or service (e.g., a viewed item that is also an affiliated item). The promotion data generally includes promotional information related to the identity of the business, the affiliated item, the identity of a financier, and the terms of the promotion, and/or the like.

The promotional data may be suitable for presentation, display, and/or the like within or in conjunction with one or more interactive elements. For instance, the interactive element(s) may be configured to redirect the user 110 to a source of the promotional offer and/or allow the user 110 to communicate with a further program configured to generate an offer for the user 110 and associated with the viewed item. Generally, some or all of the promotional data, information associated with the user 110, and/or additional user provided information may be utilized to generate a financing offer to purchase the viewed item. Thus, the enterprise system 200 functions as promotion generator to send item-based financing promotions in real-time to the user device. Such financing promotion may include, be presented in conjunction with, or be associated with interactive elements allowing the user 110 to request a financing offer or to redirecting the user to a digital location suitable to generate the financing offer.

As used herein, the terms "user" and "entity" describe at least two parties in the context of certain example events, such as commercial interactions between the entity, one or more additional entities (e.g., a business associated with a server location), and one user or multiple users, and the generation of promotional data displayed in conjunction with an interactive element. An interactive element may allow the user 110 to request a financing offer; communicate information related to financing offer generation, qualification, prequalification, etc.; and/or to direct the user 110 to an associated source of the financing offer or a program/subprogram association with a financing promotional offer. However, it is to be understood that the example of a user and an entity are merely illustrative, and that the techniques of the present disclosure are applicable to all manner of input data, and electronically viewed items, as used herein. For example, the user 110 may access a portable device with display, processing and, communication capabilities such as the computer 104, the mobile device 106, or an information/entertainment system of a vehicle (not shown). A software application, such as an offer display application 132, running on the portable device establishes communication with the enterprise system 200.

In various embodiments, the system 200, the user application programing interface 132, and/or the enterprise application programing interface 232 may include one or more subprograms and/or be associated with instructions allowing the enterprise application programing interface 232 to communicate with the user application programing interface 132 and/or an item storehouse indicative of two or more potential items (e.g., affiliated items). The item storehouse may include or indicate, for each affiliated item, promotional data and/or one or more interactive elements associated with the respective affiliated item. In some embodiments, the enterprise application programing interface 232 may be associated with instructions to receive an indication of the viewed item from the user application programing interface 132, to identify a concurrent item of the potential items that is associated with the viewed item, and/or to communicate to the user application programing interface 132 an interactive element (e.g., an interactive promotional offer). The system 200, the user application programing interface 132, and/or the enterprise application programing interface 232 may similarly include one or more subprograms and/or be associated with instructions allowing the user application programing interface 132 to communicate with the enterprise application programing interface 232 and/or one or more digital locations on one or more servers where the instructions associated with the viewed item are stored (e.g., external system 202, external system 204, and/or additional or alternative suitably configured external system 202). For instance, the system 200, the system 100, the user application programing interface 132, and/or the enterprise application programing interface 232 may include one or more drivers suitable or capable of interfacing with the applications and/or storage format of the item storehouse and/or the digital location(s) on the server(s) where the instructions associate with the viewed item are stored.

As an example, the enterprise system 200 can be a financial business that provides a downloadable program, subprogram, executable instructions or the like to affiliated entities that own or operate the servers where the instructions connected allowing the item to be viewed are stored. For example, the enterprise system 200 may provide one or more a javascript snippet or application, an iframe application, an API connection fetch, a PHP curl, or the like to one or more entities associated with the digital location(s) on the server(s) where the instructions associate with the viewed item are stored. The entity(ies) may, in turn, modify the instructions allowing implementation of the user application programing interface 132, generating the interactive element, and/or displaying the interactive element to the user 110 in connection with executing the other or original instructions stored on the server associated with the viewed item. For example, the user application programing interface 132 and/or one or more associated programs or instructions, when implemented, may present the interactive element in connection with viewing an item, such as concurrently with, simultaneously with, or in real-time.

In some embodiments, at least a portion of the instructions associated with viewing the viewed item (e.g., viewing instructions), the user application programing interface 132, and/or the enterprise application programing interface 232 may be implemented on the processing device 120, the processing device 220, and/or one or more dedicated processing device or processing devices associated with the system 200 or an entity associated with the viewed instructions (e.g., a business offering the viewed item for sale). In various embodiments, the viewing instructions, instructions associated with the user application programing interface 132, and/or instructions associated with the enterprise application programing interface 232 may be stored in an associated memory device and/or storage device of the system (e.g., memory device 124 and/or memory device 224) communicatively coupled to the associated processor(s). Additionally or alternatively, some such instructions, such as all or part of the viewing instructions and/or the user application programing interface 132 may be stored in associated memory devices and/or storage devices. For example, at least a portion of the viewing instructions and/or at least a portion of the user application programing interface 132 may be stored in the external system 202 and/or the external system 204. Instructions stored on such external system(s) 202, 204 may be communicated to an associated memory device and/or storage device of the system (e.g., memory device 124 and/or memory device 224) for subsequent processing and/or to the processing device 120 for implementation.

As shown in the exemplary embodiment of FIG. 2, a schematic illustration of an interactive element 301 suitable for presentation or display in conjunction with the viewed item, such as on the device that executes the instructions to view the viewed item (e.g., the screen 140 of mobile device 106, a screen of the computer 104, or the like). The interactive element 301 may define a portion of a screen, website page, window, or the like as an interactive promotion partition (e.g., an interactive partition 302). In various embodiments, the interactive element 301 includes one or more promotional elements (e.g., first promotional element 304, second promotion element 306, and/or third promotional element 308), as shown in FIG. 2. Some or all of the promotional elements 304, 306, 308 may be determined utilizing, at least in part, promotional data associated with the viewed item and stored within the system 200, such as within the item storehouse indicative of the potential items (e.g., affiliated items). While up to three promotional elements are depicted in the embodiment of FIG. 2, it should be appreciated that the interactive element 301 may include as many promotional elements as desired or required. As further shown, some embodiments of the interactive element 301 may include one or more media elements 312 associated with the viewed item, a source or manufacturer of the viewed item, or the financier associated with the interactive element 301.

In some embodiments, the first promotional element 304 may include or indicate a total amount. For example, the first promotion element may indicate a financed amount determined utilizing the promotional data and a transaction amount (e.g., an unfinanced price, MSRP, sale price, or the like associated with the viewed item. Additionally or alternatively, the first promotional element 304 or an additional promotional element may indicate the transactional amount of the viewed item. The second promotional element 306 may include or indicate a term, in some embodiments. For instance, the second promotional element 306 may include or indicate a number of payments, a time period between payments, and/or a total time period of the payments. In some embodiments, the third promotional element 308 may be indicative of a term amount. In various configurations, a product of the multiplication of the term and the term amount may be equal to or greater than the total amount. For example, a multiplication of the number of payments and the term amount may be equal to the financed amount. As another example, multiplication of the number of payments and the term amount may be greater than a principal amount associated with financing the viewed item. It should be appreciated that one or more of the promotional elements may indicate a financing rate associated with the promotional data.

As shown, interactive element 301 may include a selectable button, a link, or the like (executable element 310). For example, the executable element 310 may be indicative of a different digital location on the server where the viewable instructions are stored or on another server (e.g., a server associated with the financier and/or the enterprise system 200). Thus, several embodiments of the disclosed interactive element 301 may allow the user 110 executing the viewing instructions to selectively visit the different digital location or execute instructions stored at the different digital location in response to the presentation of the interactive element. In one instance, the executable element 310 may be configured or allow the user to communicate user financing information to an offer generating program (e.g., a program indicated by one or more of the instructions stored at the different digital location, such as a server or storage device of the system 200). User financing information communicated for use by the offer generating program may include one or more of a desired total amount, a desired term, a desired term amount, or a user credit score.

Thus, the system 200 or components thereof (e.g., the enterprise application programing interface 232) may receive an indication of the viewed item and communicate to the device executing the viewing instructions the interactive element 301 or data indicative of same and/or components thereof (e.g., to the user application programing interface 132). In particular, aspects of the present disclosure are directed to the communication of the interactive element 301 and/or a representation of the same for presentation in connection with the viewed item, such as concurrently or in real-time. In one instance, the enterprise application programing interface 232 and/or an associated program of the system 200 may include or implement a step to receive a communication from the device displaying the viewed item (e.g., in connection with executing the viewing instructions stored on the server). For example, such communication may be received from the user application programing interface 132. In one example, the user application programming interface 132 may communicate the viewed item ID or an output file including an indication of the viewed item ID to the enterprise application programing interface 232.

Additionally or alternatively, the processing device 220 and/or one or more dedicated processing device or processing devices associated with the system 200 may include or be associated with computer-readable instructions that, when executed, receive such a communication, such as an input item, from the device executing the viewing instructions and/or the user application programing interface 132. The received communication may include or be indicative of the viewed item and/or may be received automatically. For example, the input item generally includes one or more indications, identifiers, viewed item ID, or the like with respect to the viewed item. In various embodiments, the input data and/or an associated viewed item ID may indicate one or more of a manufacturer brand, a model code, an item tier, a serial code, a transactional amount, an evaluated amount, and/or the like.

Another step included or implemented by the enterprise application programing interface 232 and/or an associated program of the system 200 may be, in response to the receiving the input item, to compare the indication of the viewed item with potential items represented by the item storehouse. Additionally or alternatively, the processing device 220 and/or one or more dedicated processing device or processing devices associated with the system 200 may include or be associated with computer-readable instructions that, when executed, compares each potential item indicated by the item storehouse with the indication of the input item communicated to the computer.

The item storehouse generally includes or indicates the potential items/affiliated items, the associated promotional data, and/or the associated interactive element 301. The item storehouse may be represented or included in a single file, database, spreadsheet or the like; or the item storehouse may be represented by multiple such sources. The item storehouse may generally be stored within one or more storage or memory devices included or associated with the system 200 (e.g., storage device 224). Generally, the item storehouse includes or indicates the promotional data (e.g., total amount, the term, the term amount, and/or the transactional amount) for each potential item thereof. The item storehouse may further include or indicate financing data associated with an evaluated amount. An evaluated amount, as used herein, includes or indicates the total principal and interest to finance the viewed item without a subsidy.

For several potential items, such as all of the potential items, one or more entities may offer one or more subsidies to reduce the purchase price, financing price, term amount, and/or the term associated with the purchase of the viewed item. For example, the seller of the viewed item, a distributor of the viewed item, a manufacturer of the viewed item, independent organizations, and/or government or other regulatory bodies may provide a subsidy associated with the viewed item. The promotional data of a potential item may generally be associated with financing data for the item after application of a suitable subsidy. Additionally or alternatively, the promotional data may include or indicate the associated subsidy and/or details thereof. Typically, the total amount indicated by the promotional information for a potential item may be less than the evaluated amount. In other words, the total principal and interest paid for unsubsidized financing may be less than the total principal and interest paid for subsidized financing. Furthermore, the difference in the evaluated amount and the total amount indicated by the promotional data may be associated or partially associated with the subsidy. For example the total amount may be determined or partially determined from the evaluated amount and the application of one or more suitable subsidies or from the transaction amount, the application of the subsidy(ies), and the financing rate.

The present disclosure is equally applicable to situations in which one or more potential items are each associated with multiple subsidies. For example, two or more subsidies may be cumulative. In some embodiments, the item storehouse may include or indicate a cumulative interactive element 301 and/or cumulative promotional data after the application of the suitable subsidies for such a potential item. In other situations, two or more subsidies associated with the potential item(s) may be mutually exclusive. Additional or alternative embodiments of the item storehouse may include or indicate two or more mutually exclusive interactive elements 301 and/or the associated promotional data (such as promotional data associated with each mutually exclusive interactive element 301) for such a potential item.

A further step included or implemented by the enterprise application programing interface 232 and/or an associated program of the system 200 may be to identify a concurrent item of the potential items that is associated with the input item and the interactive element 301 that is associated with the concurrent item. Additionally or alternatively, the processing device 220 and/or one or more dedicated processing device or processing devices associated with the system 200 may include or be associated with computer-readable instructions that, when executed, identify the concurrent item of the potential items that is associated with the input item and the interactive element(s) 301 that is associated with the concurrent item. For example, the indication(s) associated with the viewed item may be utilized to identify the concurrent item of the item storehouse that is the same as or associated with the viewed item.

The enterprise application programing interface 232 and/or an associated program of the system 200 may further include or implement a step to communicate to the device executing the viewing instructions a representation of the interactive element(s) 301 that is associated with the concurrent item and that is indicative of the total amount, the term, and/or the term amount. Additionally or alternatively, the processing device 220 and/or one or more dedicated processing device or processing devices associated with the system 200 may include or be associated with computer-readable instructions that, when executed, communicate to the device executing the viewing instructions a representation of the interactive element that is associated with the concurrent item and that is indicative of the total amount, the term, and/or the term amount.

For example, the interactive element 301 (e.g., a file that, when executed, produces the interactive element 301 in connection with the viewed item) may be communicated to the application programing interface 132 and/or the memory device 120 and thereafter executed by the processing device 120. In an additional or alternative embodiment, a representation of the interactive element 301 (e.g., a file that indicates the promotional data, the total amount, the term, and/or the term amount) may be communicated to the application programing interface 132 and/or the processing device 120. In such embodiments, the application programing interface 132 and/or an associated program of the system 100 may include or implement instructions to generate the interactive element 301 utilizing the representation of the same. An exemplary application programing interface 132 may be configured to generate the interactive element 301 including the executable element 310 and one or more promotional elements (e.g., element 304, element 306, and/or element 308) determined utilizing, at least in part, promotional data associated with the concurrent item/viewed and communicated from the system 200. Additionally or alternatively, the user application programing interface 132 may be configured to communicate the representation of the interactive element 301 an associated graphical user interface that is utilized to present the interactive element 301 and/or the executable element 310 on a screen of user device.

Thus, the representation communicated from the system 200 and/or the enterprise application programing interface 232 may be suitable for use in presenting and/or generating the executable element(s) 301 and an indication of the total amount, the term, and/or the term amount of a promotional offer concurrently with viewing the item (e.g., executing the viewing instructions). As explained above, the concurrent item (i.e., the viewed item) may be associated with an evaluated amount. The evaluated amount may generally be greater than the total amount indicated by the interactive element 301 that is associated with the concurrent item in view of the application of one or more suitable subsidies. As explained in more detail above, the total amount associated with the concurrent item may be determined or partially determined from the evaluated amount of the concurrent item, the subsidy(ies) associated with interactive element, the transaction amount, and/or the interest rate associated with the interactive element 301. Generally, the total amount associated with an interactive element 301 may be determined from the other promotional data associated with the interactive element 301. As explained in more detail above, the total amount associated with the concurrent item may be determined or partially determined from the evaluated amount of the concurrent item, the subsidy(ies) associated with interactive element, the transaction amount, and/or the financing rate associated with the interactive element 301.

Furthermore, some embodiments of the interactive element 301 allow for the user to communicate the user financing information to the offer generating program. In some instances, the offer generating program may utilize the user financing information and/or the indication or representation of the interactive element 301 (or the information thereof) to generate a user customized promotional offer. For instance, the user application programing interface 132 may be configured to communicate the user financing information to the offer generating program and receive a representation of the user customized promotional offer.

As shown in the exemplary embodiment of FIG. 3, a schematic illustration of a user customized promotional offer 401 suitable for presentation or display in conjunction with the viewed item, such as on the device that executes the instructions to view the viewed item (e.g., the screen 140 of mobile device 106, a screen of the computer 104, or the like). The user customized promotional offer 401 may define a portion of a screen, website page, window, or the like as a promotion partition (e.g., an offer partition 402). In various embodiments, the user customized promotional offer 401 includes one or more customized promotional elements (e.g., first promotional element 404, second promotion element 406, and/or third promotional element 408), as shown in FIG. 3. Some or all of the customized promotional elements 404, 406, 408 may be determined utilizing, at least in part, the user financing information, the representation of the interactive element 301, and/or promotional data associated with the viewed item and stored within the system 200, such as within the item storehouse indicative of the potential items (e.g., affiliated items). While up to three customized promotional elements are depicted in the embodiment of FIG. 3, it should be appreciated that the user customized promotional offer 401 may include as many customized promotional elements as desired or required. As further shown, some embodiments of the user customized promotional offer 401 may include one or more media elements 412 associated with the viewed item, the source or manufacturer of the viewed item, or the financier associated with the user customized promotional offer 401.

In some embodiments, the first customized promotional element 404 may include or indicate a total amount. For example, the first customized promotion element 404 may indicate a total cost or financed amount determined utilizing the user financing data, the promotional data, the evaluated amount, and/or the transaction amount. The second customized promotional element 406 may include or indicate an annual percentage rate, in some embodiments. For instance, the second customized promotion element 406 may indicate promotional early interest rate determined utilizing the promotional data and the provided user financing information. Similarly and in some embodiments, the third customized promotional element 406 or additional or alternative customized promotional elements may be indicative of one or more of a payment amount, a total cost, an interest cost, or associated terms of the financing promotion represented by the user customized promotional offer.

As shown, the user customized promotional offer 401 may include a selectable button, a link, or the like (executable element 410). For example, the executable element 410 may be indicative of a different digital location on the server associated with the offer generating program or on another server (e.g., a server associated with the financier and/or the enterprise system 200). Thus, several embodiments of the user customized promotional offer 401 may allow the user 110 executing the viewing instructions to selectively visit an application location in response to interaction with the executable element 410. In one instance, the executable element 410 may be configured or allow the user to contact the financier associated with the user customized promotional offer 401 or to request that the financer contact the user, such as via phone, email, or the like.

In various embodiments, the user application programing interface 132 may include or be associated with a graphical user interface (e.g., GUI 501 of FIG. 4). The GUI 501 generally allows for the display of the viewed item, the interactive element 301, and/or a customized promotional offer 401. Furthermore, the GUI 501 may enable user interaction with the same, such as the executable element(s) 310, 410. For instance, one or more components a GUI architecture 502 may be displayed to a user and/or to generate a visual representation of such information and/or in order to allow the user to interest with elements of the visual representations, such as to receive inputs.

In various embodiments, one or more of the schematic elements may be combined, arranged alternatively, omitted, and/or displayed selectively, individually, or in combination. The GUI 501 is configured to, includes instructions to, is associated with instructions to, or the like to generate one or more representations of the viewed item 504, the interactive element 301, and/or the user customized promotional offer 401. It should be appreciated that the viewed item 504, the interactive element 301, and/or the user customized promotional offer 401 may be displayed to a user sequentially, simultaneously, or both. The GUI 501 may generally receive one or more of the viewing instructions, the representation of the interactive element, and/or the representation of the user customized promotional offer and generate or display the viewed item 504, the interactive element 301, and/or the user customized promotional offer 401, respectively.

In some embodiments and as illustrated in FIG. 4, the GUI architecture 502 may correspond or be implemented on some or all of the screen of the user device (e.g., the screen 140 of mobile device 106, a screen of the computer 104, or the like). In some embodiments, the GUI architecture 502 may define a window, such as a window of a web browser, or appropriate user application. Thus, the GUI architecture 502 may include window navigators (e.g., scroll bars 506, a nested interface of windows or popups, or an interactive graphical representation of the neurons of a symbolic neural interconnection). The scroll bars 506 may allow the user to selectively navigate a webpage or the like until reaching the viewing instructions, at which point the GUI 501 may generate the graphical representation of the viewed item 504 on the display of the user computing device. In response to displaying the viewed item 504, the interactive element 301 may be determined and communicated to the GUI 501, as described herein. The GUI 501 may automatically present the interactive element 301 on the display of the device and in association with the viewed item 504, such as in proximity to the viewed item 504. In some embodiments and after the user communicates user financing information to the offer generating program, as described herein. The GUI 501 may receive the representation of the user customized promotional offer and automatically present the user customized promotional offer 401 in association with the viewed item 504, such as in proximity to the viewed item 504.

Thus, FIG. 4 illustrates the GUI architecture 502 of the exemplary GUI 501 with various elements allowing the user to generate a representation of the viewed item (e.g., an image of the viewed item 504), the interactive element 301, and/or the user customized promotional offer 401. However, the following discussion is equally applicable to other suitable configurations of an interface, graphical interface, or similar executable program capable of representing such elements of the GUI architecture 502 or sub-elements of the same. For example, the present disclosure is equally applicable to similar interfaces adapted for use by a user with one or more disabilities, such as blindness, deafness, and the like.

As explained above, some potential items and/or the concurrent item may be associated with multiple, mutually exclusive subsidies. In one instance, the concurrent item may be associated with multiple interactive elements 301, each associated with one of the mutually exclusive subsidies. In some embodiments, each of the interactive elements 301 and/or representations of the same associated with the concurrent item may be communicated to the device executing the viewing instructions. Additionally or alternatively, the enterprise application programing interface 232 and/or an associated program of the system 200 may be configured to compare the interactive elements, such as the promotional data indicated by the respective elements, and communicate a representation of a preferred interactive element 301 associated with the concurrent item. For example, the programing interface 232, the system 200, etc. may include or implement instructions (e.g., utilizing the processing device 220) to communicate to the viewing device (e.g., mobile device 106, computing device 104, or the like) the interactive element 301 indicative of the lowest total amount. Thus, the GUI 501 may produce the GUI architecture 502 including each interactive element 301 simultaneously or sequentially. Alternatively, the GUI architecture 502 may only include the preferred interactive element 301 (e.g., including or indicating the lowest total amount.

Referring now to FIG. 5, an exemplary embodiment of a method 600 is illustrated for determining a concurrent interactive element in connection with executing instructions stored on the server. As shown in element 602, the method 600 may include receiving a communication in connection with executing the instructions stored on the server. For example, the enterprise application programing interface 232 may receive data from the user application programing interface 132 indicating the viewed item in response to the execution of some or all of the viewing instructions. In some embodiments, the method 600 may further include (e.g., method element 604) comparing the indication of the viewed item with the potential items represented by the item storehouse. As explained above, each potential item may be associated with one or more interactive elements 301. As depicted in method element 606 and in some embodiments, the method includes identifying a concurrent item of the potential items that is associated with the viewed item and the interactive element that is associated with the concurrent item, as shown in method element 606. The method 600 may further include (e.g., method element 608) communicating a representation of the interactive element that is associated with the concurrent item and that is indicative of an executable element and a total amount, a term, and/or a term amount, as shown in method element 608.

For instance, the enterprise application programing interface 232 may communicate the representation of the interactive element 301 to the user application programing interface 132. In turn, the programing interface 232 may display (or generate and then display) the interactive element 301 such that the executable element 310 and the total amount, the term, and/or the term amount are presented in connection with the viewed item, such as concurrently or in real-time. As explained above and in some embodiments, the evaluated amount associated with the concurrent item (e.g., a summation of the paid principle and the interest paid in relation to an unsubsidized financing offer) may be greater than the total amount (e.g., a summation of the financee paid principle and interest in relation to a subsidized financing offer or promotional offer). In some instances, the concurrent item may be a potential item associated with multiple interactive elements 301. In such instances, the method 600 may include communicating the respective interactive element 301 associated with the concurrent item having the lowest total amount.

Referring now to FIG. 6, an exemplary embodiment of a method 700 is illustrated for concurrently presenting an interactive element in connection with executing instructions stored on a server. In some embodiments, the method 700 may include receiving the viewing instructions stored on the server configured to present a viewed item for transfer of title. The viewing instructions may include an indication of the viewed item ID. As shown at element 702, the method 700 may include receiving interface instructions stored on the server and associated with the viewing instructions. The method may further include (see element 704) executing some or all of the viewing instructions such that the viewed item is presented to a user on a display of the computing station. The method may include communicating, to a second server, an indication of the viewed item ID, as shown in method element 706. For example, an output file indicating the viewed item ID may be communicated from the user application programing interface 132 to the enterprise programing interface 232. In some embodiments, the method 700 may include identifying that the viewed item 504 is currently presented on the display associated with the computing device. In some embodiments, the method 700 may include communicating the indication of the viewed item automatically in response to identifying the viewed item or displaying the viewed item 504. The method 700 may further include receiving the representation of the interactive element that is associated with the concurrent item that is identified as the viewed item, as shown in element 708. For example, interactive element 301 and/or an output file indicative of the interactive element 301, the total amount, the term, and/or the term amount may be communicated from the enterprise programing interface 232 to the user application programing interface 132. The method 700 (e.g., element 710) may further include presenting, on the display of the user computing device and in association with the viewed item, the executable element 301 and one or more of the total amount, the term, or the term amount utilizing the representation of the interactive element. For example, the GUI 501 may be utilized to generate the GUI architecture 502 or the like from the representation of the interactive element 301. Some embodiments of the method 700 may further include communicating the user financing information to the offer generating program indicated by the executable element 310 of the interactive element 301 (e.g., the instructions stored at the different digital location. Thus and in some embodiments, the method 700 may include receiving, at the computing device, the representation of a user customized promotional offer and/or presenting, on the display of the computing device and in association with the viewed item, the user customized promotional offer 510.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for interfacing with at least one application programing interface to generate a graphical representation of an interactive element, the system comprising:
    at least one computer including one or more processors and at least one of a memory device and a non-transitory storage device, wherein the one or more processors execute:
    a user application programming interface configured to perform steps including:
        receive, at a computing device, viewing instructions stored on the server and configured to present a viewed item for transfer of title, the instructions including an indication of a viewed item ID;
        communicate, to a second server, an indication of the viewed item ID in response to executing the viewing instructions;
        receive, at the computing device, a representation of an interactive element that is associated with the concurrent item that is identified as the viewed item; and
        communicate the representation of the interactive element that is associated with the concurrent item to a graphical user interface;
    a second server application programing interface configured to perform steps including:
        receive a communication in connection with executing at least a portion of the viewing instructions to present the viewed item, the communication including the indication of the viewed item ID;
        compare, in response to the communicated indication of the viewed item ID, the indication of the viewed item ID with a plurality of potential items represented by an item storehouse, wherein each potential item is associated with a potential interactive element;
        identify a concurrent item of the plurality of potential items that is associated with the viewed item and an interactive element that is associated with the concurrent item, the interactive element indicative of an executable element and at least one of a total amount, a term, or a term amount; and
        communicate, to the computing device, a representation of the interactive element that is associated with the concurrent item;
    a graphical user interface configured to perform steps including:
        execute at least a portion of the viewing instructions such that the viewed item is presented to a user on a display of the computing device;
        receive the representation of the interactive element that is associated with the concurrent item that is identified as the viewed item;
        generate, based on the representation of the interactive element, the interactive element; and
        present, on the display of the computing device and in association with the viewed item, the executable element and at least one of the total amount, the term, or the term amount utilizing the generated interactive element.

2. The system of claim 1, wherein a product of a multiplication of the term and the term amount is equal to or greater than the total amount.

3. A system for interfacing with at least one application programing interface to generate a graphical representation of an interactive element, the system comprising:
    at least one computer including one or more processors and at least one of a memory device and a non-transitory storage device, wherein the one or more processors execute computer-readable instructions to:
        receive, at a computing device, viewing instructions stored on the server configured to present a viewed item for transfer of title, the instructions including an indication of a viewed item ID;
        execute at least a portion of the viewing instructions such that the viewed item is presented to a user on a display of the computing device;
        receive a communication in connection with executing the instructions stored on the server, the communication including the indication of the viewed item ID;
        compare, in response to the communicated indication of the viewed item ID, the indication of the viewed item ID with a plurality of potential items represented by an item storehouse, wherein each potential item is associated with a potential interactive element;
        identify a concurrent item of the plurality of potential items that is associated with the viewed item and an interactive element that is associated with the concurrent item, the interactive element indicative of an executable element and at least one of a total amount, a term, or a term amount;
        receive, at a graphical user interface, the representation of the interactive element that is associated with the concurrent item that is identified as the viewed item;
        generate, based on the representation of the interactive element, the interactive element utilizing the graphical user interface; and
        present, on the display of the computing device and in association with the viewed item, the executable element and at least one of the total amount, the term, or the term amount utilizing the generated interactive element and the graphical user interface.

4. The system of claim 3, wherein a product of a multiplication of the term and the term amount is equal to or greater than the total amount.

5. The system of claim 3, wherein the one or more processors further execute instructions to:

communicate, to the computing device, a representation of the interactive element that is associated with the concurrent item.

6. The system of claim 3, wherein at least one potential item of the plurality of potential items is associated with a plurality of interactive elements.

7. The system of claim 6, wherein, when the concurrent item is a potential item associated with a plurality of interactive elements, the one or more processors execute computer-readable instructions to:
communicate a representation of each interactive element that is associated with the concurrent item;
receive, at the graphical user interface, the representation of each interactive element that is associated with the concurrent item that is identified as the viewed item;
generate, based on each representation of the interactive element, each interactive element utilizing the graphical user interface; and
present, on the display of the computing device and in association with the viewed item, the executable element and at least one of the total amount, the term, or the term amount for each interactive element that is associated with the concurrent item utilizing the graphical user interface.

8. The system of claim 6, wherein, when the concurrent item is a potential item associated with a plurality of interactive elements, the one or more processors execute computer-readable instructions to:
communicate a representation of the interactive element indicative of the lowest total amount.

9. The system of claim 3, wherein two or more potential items of the plurality of potential items are each associated with a plurality of interactive elements.

10. The system of claim 3, wherein the concurrent item is associated with an evaluated amount, the evaluated amount greater than the total amount indicated by the interactive element that is associated with the concurrent item.

11. The system of claim 10, wherein a difference between the evaluated amount and the total amount associated with the concurrent item is associated, at least in part, with a subsidy.

12. The system of claim 10, wherein the total amount indicated by the interactive element that is associated with the concurrent item is determined, at least in part, from the evaluated amount associated with the concurrent amount, the subsidy, and an interest rate associated with the interactive element.

13. The system of claim 3, wherein the interactive element is indicative of a different digital location on the server or on another server, wherein the representation of the interactive element that is associated with the concurrent item is configured such that a user executing the instructions stored on a server may selectively visit the different digital location or execute instructions stored at the different digital location.

14. The system of claim 13, wherein the one or more processors further execute instructions to:
communicate user financing information to an offer generating program indicated by the instructions stored at the different digital location.

15. The system of claim 14, wherein the user financing information is indicative of at least one of a desired total amount, a desired term, a desired term amount, or a user credit score.

16. The system of claim 15, wherein the one or more processors further execute instructions to:
receiving, at the computing device, a representation of a user customized promotional offer.

17. The system of claim 15, wherein the one or more processors further execute instructions to:
present, on the display of the computing device and in association with the viewed item, the user customized promotional offer indicative of at least one of an annual percentage rate, a payment amount, a total cost, an interest cost, or associated terms utilizing the graphical user interface.

18. The system of claim 17, wherein the user customized promotional offer is presented in proximity to the viewed item.

19. The system of claim 3, wherein the interactive element is presented on the display of the computing device and in proximity to the viewed item.

20. The system of claim 3, wherein the viewed item ID is indicative of at last one of a model code, a serial code, or an evaluated amount associated with the viewed item.

* * * * *